US011910041B2

(12) United States Patent
Harrell et al.

(10) Patent No.: US 11,910,041 B2
(45) Date of Patent: *Feb. 20, 2024

(54) IN-STREAM CONTROLS FOR NATIONAL VIDEO DISTRIBUTION

(71) Applicant: TIVO CORPORATION, San Jose, CA (US)

(72) Inventors: Michael Harrell, Parker, CO (US); Eric Middlemist, Littleton, CO (US); Christopher Weaver, Littleton, CO (US)

(73) Assignee: TiVo Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,300

(22) Filed: Oct. 25, 2022

(65) Prior Publication Data

US 2023/0052678 A1  Feb. 16, 2023

Related U.S. Application Data

(63) Continuation of application No. 17/210,945, filed on Mar. 24, 2021, now Pat. No. 11,528,518, which is a
(Continued)

(51) Int. Cl.
*H04N 21/236* (2011.01)
*H04N 21/235* (2011.01)
(Continued)

(52) U.S. Cl.
CPC ..... *H04N 21/23614* (2013.01); *H04N 21/222* (2013.01); *H04N 21/235* (2013.01);
(Continued)

(58) Field of Classification Search
CPC .......... H04N 21/222; H04N 21/23424; H04N 21/23439; H04N 21/235; H04N 21/23614;
(Continued)

(56) References Cited

U.S. PATENT DOCUMENTS 6,704,930 B1   3/2004   Eldering et al.
7,068,724 B1   6/2006   Hamilton
(Continued)

FOREIGN PATENT DOCUMENTS

| EP | 0618695 A2 | 10/1994 |
|----|-----------|---------|
| WO | 2005109901 A1 | 11/2005 |
| WO | 2007016307 A2 | 2/2007 |

OTHER PUBLICATIONS

Current Status of HDTV Delivery Technology (Spring 08), EBU—TECH 3328, Geneva May 2008, pp. 1-26.

*Primary Examiner* — Michael B. Pierorazio
(74) *Attorney, Agent, or Firm* — Haley Guiliano LLP

(57) ABSTRACT

Systems and methods are described for delivering regional content for a lineup over a national network. A content provider may select a particular regional broadcast for inclusion in a regional service lineup. The content provider may be able to broadcast multiple, or even all, services nationally. At regional distribution centers, a multiplexer may select only those services that are desired for the region in response to in-stream signals. In some instances, a single region-specific version of a given service may be selected from multiple versions broadcasted nationally. The regional lineup, including the selected services, can then be multiplexed and transmitted to customers throughout the region.

16 Claims, 7 Drawing Sheets

Related U.S. Application Data continuation of application No. 16/829,745, filed on Mar. 25, 2020, now Pat. No. 10,992,971, which is a continuation of application No. 16/033,517, filed on Jul. 12, 2018, now Pat. No. 10,638,171, which is a continuation of application No. 14/867,562, filed on Sep. 28, 2015, now Pat. No. 10,070,161.

(51) Int. Cl.

| | | |
|---|---|---|
| H04N 21/234 | (2011.01) | |
| H04N 21/2365 | (2011.01) | |
| H04N 21/237 | (2011.01) | |
| H04N 21/238 | (2011.01) | |
| H04N 21/2381 | (2011.01) | |
| H04N 21/24 | (2011.01) | |
| H04N 21/262 | (2011.01) | |
| H04N 21/643 | (2011.01) | |
| H04N 21/81 | (2011.01) | |
| H04N 21/222 | (2011.01) | |
| H04N 21/2343 | (2011.01) | |
| H04N 21/2668 | (2011.01) | |
| H04N 21/6338 | (2011.01) | |

(52) U.S. Cl.
CPC ....... *H04N 21/237* (2013.01); *H04N 21/2365* (2013.01); *H04N 21/2381* (2013.01); *H04N 21/23424* (2013.01); *H04N 21/23439* (2013.01); *H04N 21/23805* (2013.01); *H04N 21/2407* (2013.01); *H04N 21/2668* (2013.01); *H04N 21/26241* (2013.01); *H04N 21/6338* (2013.01); *H04N 21/64322* (2013.01); *H04N 21/8126* (2013.01)

(58) Field of Classification Search
CPC ............. H04N 21/2365; H04N 21/237; H04N 21/23805; H04N 21/2381; H04N 21/2407; H04N 21/26241; H04N 21/2668; H04N 21/6338; H04N 21/64322; H04N 21/8126
See application file for complete search history.

(56) References Cited

U.S. PATENT DOCUMENTS

| | | | |
|---|---|---|---|
| 7,564,873 B1 | 7/2009 | Zack et al. | |
| 7,912,219 B1 | 3/2011 | Michener et al. | |
| 8,104,056 B2 | 1/2012 | Sofos et al. | |
| 8,161,519 B2 | 4/2012 | Krause et al. | |
| 8,233,623 B2 | 7/2012 | Wingert et al. | |
| 8,239,908 B2 | 8/2012 | Sofos et al. | |
| 8,245,263 B2 | 8/2012 | Sofos et al. | |
| 8,265,104 B2 | 9/2012 | Helms et al. | |
| 8,300,541 B2 | 10/2012 | Cholas et al. | |
| 8,352,982 B2 | 1/2013 | De Heer et al. | |
| 8,364,022 B2 | 1/2013 | Sofos et al. | |
| 8,499,318 B2 | 7/2013 | Walker | |
| 8,621,508 B2 | 12/2013 | Rowe et al. | |
| 8,699,530 B2 | 4/2014 | Helms et al. | |
| 8,730,985 B2 | 5/2014 | Staniec et al. | |
| 8,763,029 B1* | 6/2014 | Haberman | H04N 21/26241 |
| | | | 725/38 |
| 8,792,899 B2 | 7/2014 | Walker et al. | |
| 8,806,528 B1 | 8/2014 | Streeter et al. | |
| 9,319,755 B2* | 4/2016 | Fusco | H04N 21/2381 |
| 10,070,161 B2* | 9/2018 | Harrell | H04N 21/2381 |
| 10,638,171 B2* | 4/2020 | Harrell | H04N 21/23439 |
| 10,992,971 B2* | 4/2021 | Harrell | H04N 21/2668 |
| 11,528,518 B2* | 12/2022 | Harrell | H04N 21/2365 |
| 2003/0048813 A1 | 3/2003 | Lahav et al. | |
| 2004/0168121 A1 | 8/2004 | Matz | |
| 2005/0108763 A1 | 5/2005 | Baran et al. | |
| 2005/0190794 A1* | 9/2005 | Krause | H04N 21/26216 |
| | | | 370/485 |
| 2005/0251843 A1* | 11/2005 | Walker | H04N 21/4383 |
| | | | 348/E7.063 |
| 2007/0172061 A1 | 7/2007 | Pinder | |
| 2007/0226765 A1 | 9/2007 | Bahnck et al. | |
| 2008/0066095 A1 | 3/2008 | Reinoso | |
| 2009/0119703 A1* | 5/2009 | Piepenbrink | H04N 21/25841 |
| | | | 725/34 |
| 2009/0187939 A1* | 7/2009 | Lajoie | H04N 7/17318 |
| | | | 725/87 |
| 2010/0125867 A1 | 5/2010 | Sofos et al. | |
| 2010/0169914 A1 | 7/2010 | Williamson et al. | |
| 2010/0253847 A1 | 10/2010 | Krause et al. | |
| 2010/0296572 A1 | 11/2010 | Ramaswamy et al. | |
| 2010/0299715 A1* | 11/2010 | Slothouber | H04N 21/6582 |
| | | | 725/118 |
| 2010/0325658 A1* | 12/2010 | Schlack | H04N 21/26258 |
| | | | 725/32 |
| 2011/0015989 A1* | 1/2011 | Tidwell | G06Q 30/02 |
| | | | 705/14.43 |
| 2011/0016479 A1* | 1/2011 | Tidwell | H04N 21/25891 |
| | | | 725/9 |
| 2011/0035772 A1 | 2/2011 | Ramsdell et al. | |
| 2011/0041147 A1 | 2/2011 | Piepenbrink et al. | |
| 2011/0041149 A1 | 2/2011 | Piepenbrink et al. | |
| 2011/0126248 A1 | 5/2011 | Fisher et al. | |
| 2011/0138414 A1* | 6/2011 | Koren | H04N 21/858 |
| | | | 725/35 |
| 2011/0302600 A1* | 12/2011 | Kelsen | H04N 21/812 |
| | | | 725/32 |
| 2012/0011542 A1 | 1/2012 | Holden | |
| 2012/0060182 A1 | 3/2012 | Hardin | |
| 2013/0064283 A1 | 3/2013 | Sun et al. | |
| 2013/0247094 A1* | 9/2013 | Hardin | H04N 21/2385 |
| | | | 725/33 |
| 2013/0260796 A1 | 10/2013 | Hasek | |
| 2013/0290556 A1 | 10/2013 | Giladi | |
| 2014/0020013 A1* | 1/2014 | DiLorenzo | G06Q 30/0251 |
| | | | 725/32 |
| 2014/0078403 A1* | 3/2014 | Joslyn | H04N 21/6582 |
| | | | 348/731 |
| 2014/0282682 A1* | 9/2014 | Samant | H04N 21/26613 |
| | | | 725/28 |
| 2014/0282777 A1* | 9/2014 | Gonder | H04N 21/2225 |
| | | | 725/116 |
| 2015/0039389 A1* | 2/2015 | Besehanic | H04N 21/251 |
| | | | 705/7.29 |
| 2015/0256902 A1* | 9/2015 | Fusco | H04N 21/25841 |
| | | | 725/33 |
| 2021/0211751 A1 | 7/2021 | Harrell et al. | |

* cited by examiner

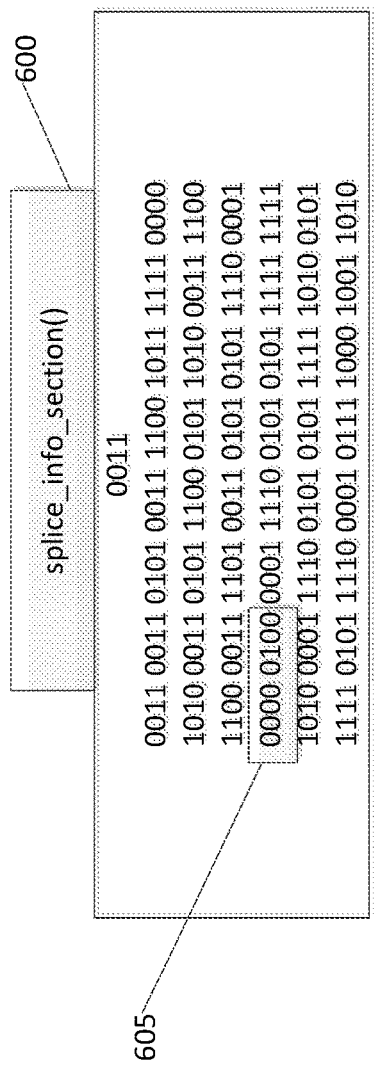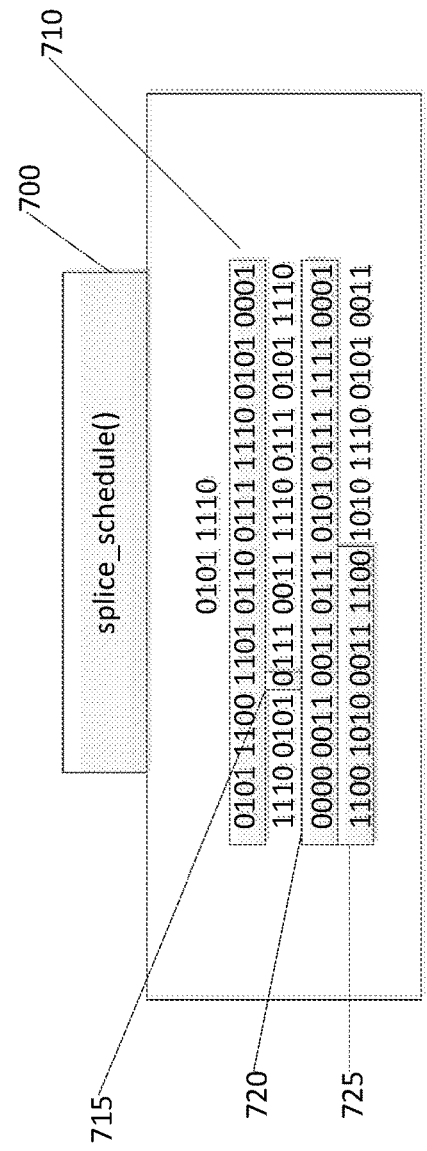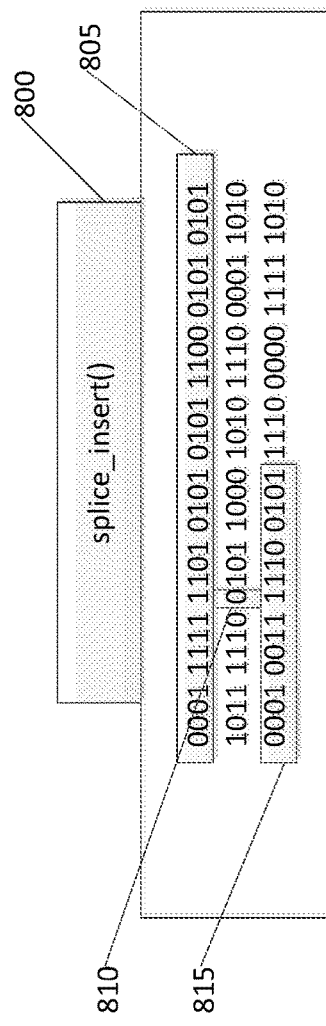
FIG. 6
FIG. 7
FIG. 8

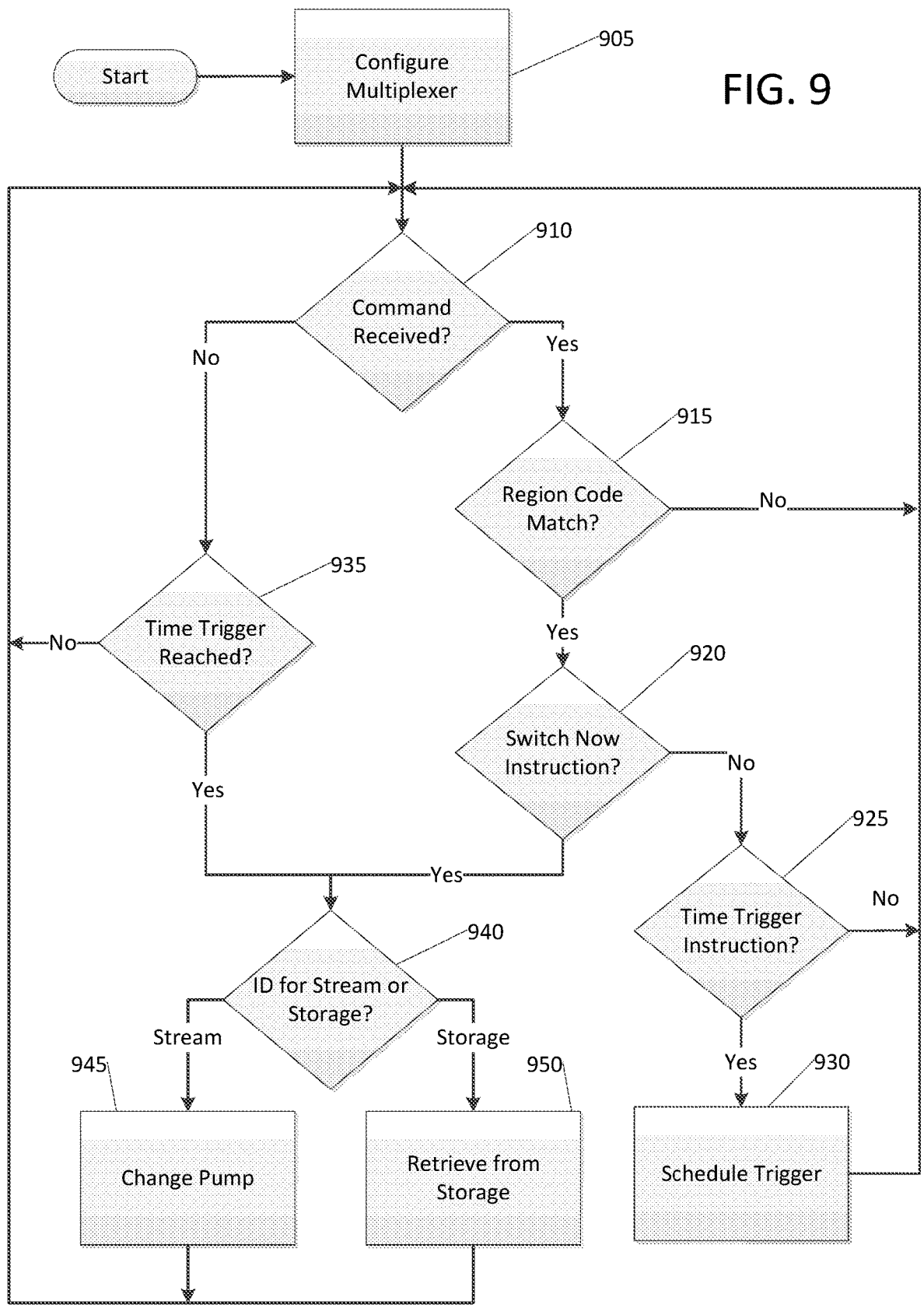

IN-STREAM CONTROLS FOR NATIONAL VIDEO DISTRIBUTION

CROSS-REFERENCE TO RELATED APPLICATIONS

This application is a continuation of U.S. patent application Ser. No. 17/210,945, filed Mar. 24, 2021, which is a continuation of U.S. patent application Ser. No. 16/829,745 (now U.S. Pat. No. 10,992,971), filed on Mar. 25, 2020, which is a continuation of U.S. patent application Ser. No. 16/033,517 (now U.S. Pat. No. 10,638,171), filed Jul. 12, 2018, which is a continuation of U.S. application Ser. No. 14/867,562 (now U.S. Pat. No. 10,070,161) filed Sep. 28, 2015. The disclosures of each application are hereby incorporated by reference herein in their entireties.

BACKGROUND

Telecommunication systems are increasing in complexity and bandwidth. In addition, content distributors have increasing numbers of options available for distribution to their customers. In many instances, content distributors often operate with content providers to provide content tailored to customers in different regions. Providing content to those customers is a complicated hurdle for distributors, and the technology behind that distribution is always changing. However, much of the technology being used for distribution backbones has remained fairly stagnant in recent years.

Distributors may encounter situations where content must be delivered to one customer but not another. For example, a distributor may have a sports broadcast intended for a customer in Washington, and another broadcast might be better suited for customers in California. In another example, a football game might be scheduled to air in a particular time slot on a particular channel, but if the tickets to the game do not sell out, contractual obligations might require that the football game not be aired to households in an area (e.g., a blackout area) around the stadium. In such examples, the distributor might have to insert new content to fill the timeslot that would ordinarily have carried the football game. Such a swapping in, and swapping out, of content can be a complicated process, and there remains an ever-present need for improved ways to carry out this swapping.

SUMMARY

According to some aspects described herein, a system may provide for delivering regional content for a lineup over a national network. A content provider may intend to select a particular regional broadcast for inclusion in a regional lineup. The content provider may be able to broadcast multiple, or even all, services nationally. In some instances, a service may be a channel. At regional distribution centers, a multiplexer may select only those services that are desired for the region in response to in-stream signals. In some instances, a single region-specific version of a given service may be selected from multiple versions broadcasted nationally. The regional lineup, including the selected services, may then be transmitted to customers throughout the region.

Multiplexing controls may be embedded inside content streams. Since the content stream may contain instructions for multiplexing, a multiplexer may then simply react to those instructions, switching between content on the fly. For example, a Society of Cable Telecommunications Engineers (SCTE) 35 protocol command may be inserted into the content stream. The command may contain instructions for switching the multiplexer. The instructions may indicate a region to be received, identify the stream, identify a tier of service, or provide any other means for the multiplexer to identify content streams to include in a regional lineup.

In some embodiments, a multiplexer for a given region may receive a number of alternative video feeds. The video feeds may be made up of alternative feeds that may be used for a single spot in a regional service lineup provided by the multiplexer to downstream users, and each feed may include multiplexing instructions for how that particular feed should be selected for inclusion in the regional service lineup. The multiplexer may select one of the alternative video feeds to be included in the regional service lineup based on those multiplexing instructions. The multiplexer may transmit the regional service lineup that includes one of the different alternative video feeds. In some instances, the regional service lineup may include one of a number of alternate video feeds and a number of other feeds. In some embodiments, the multiplexer may monitor the selection of one of the number of alternative video feeds and may record this monitoring in a log. In some instances, the number of different video feeds may include Internet Protocol feeds, and the regional service lineup may include a transmission by quadrature amplitude modulation (QAM). In some instances, the multiplexing instructions may include in-stream messaging. In some embodiments, the in-stream messaging may include an SCTE 35 protocol command. In some instances, the selection of one of a number of different video feeds may compare regional identifiers provided by a scheduler with the SCTE 35 protocol command. In some embodiments, a primary video feed may include a first variable bitrate with a minimum bitrate, and each of the plurality of alternate video feeds may have a constant bitrate less than or equal to the minimum bitrate.

In some instances, a scheduler may create a schedule, indicating the channel lineup(s) that each regional multiplexer is supposed to provide to the regional multiplexer's downstream users or devices, and may provide the schedule to one or more signal inserters. The signal inserters may receive the schedule, and the national feeds (which may contain many feeds of audiovisual services), and may insert control commands into the feeds themselves (e.g., using a field in a video stream data protocol) that the various regional multiplexers would use to automatically select the correct feeds and provide the appropriate service lineup that they are to provide to their downstream users or devices. In some embodiments, the instruction inserted by the signal inserter may include an Event Signaling and Messaging (ESAM) instruction, inserted into the feeds using SCTE35 protocols. The signals embedded in the various video feeds may allow the regional multiplexers to select video feeds and insert them into the multiplexers' respective service lineups without requiring the multiplexers to decode the video and re-encode the video.

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which:

FIG. 6 depicts an illustrative example of a section command;

FIG. 7 depicts an illustrative example of a schedule command;

FIG. 8 depicts an illustrative example of an insert command; and

FIG. 9 depicts an illustrative method for multiplexing based on in-stream signaling.

DETAILED DESCRIPTION

According to some aspects described herein, a system may select content streams from among a plurality of content streams supplied by a content provider. In some embodiments, content streams may be video feeds. In some instances, the video feeds may be individual services that may be transmitted to a user. The selected content streams may be used to form a regional service lineup. In some instances, there may be a number of alternative content streams for a given slot in the lineup. For example, a sports channel might have one broadcast intended for Washington, and another intended for Texas. The content streams may contain embedded instructions which may instruct a multiplexer to select one or more streams from among the content streams. In some instances, a Society of Cable Telecommunications Engineers (SCTE) 35 protocol command may be inserted into the content stream in order to provide instructions to the multiplexer. This may allow the multiplexer to select a particular content stream for inclusion on the regional service lineup and multiplex the stream into the lineup on the fly. The regional service lineup may then be transmitted to consumers.

Figure 1:
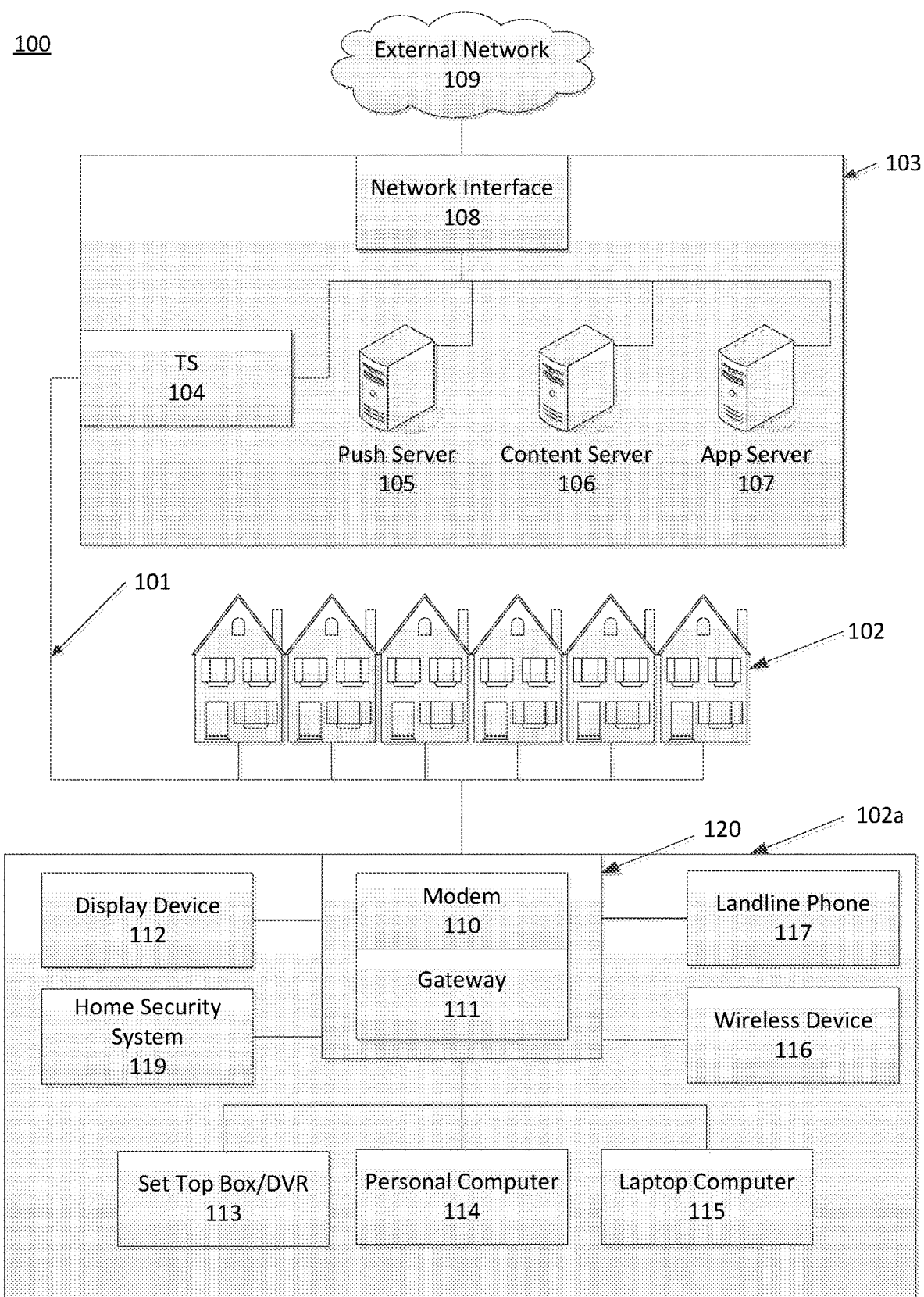
FIG. 1 depicts an illustrative network environment in which one or more aspects of the disclosure may be implemented.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

The local office 103 may transmit downstream information signals onto the communication links 101, and one or more of the premises 102 may receive and process those signals. In certain implementations, the communication links 101 may originate from the local office 103 as a single communications path, and may be split into any number of communication links to distribute data to the premises 102 and various other destinations. Although the term premises is used by way of example, the premises 102 may include any type of user environment, such as single family homes, apartment complexes, businesses, schools, hospitals, parks, and other environments and combinations of environments.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The one or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The premises 102, such as the example home 102a, may include an interface 120, which may include a modem 110 (or any device), for communicating on the communication links 101 with the local office 103, the one or more external networks 109, or both. For example, the modem 110 may be a coaxial cable modem (for coaxial cable links), a broadband modem (for DSL links), a fiber interface node (for fiber-optic links), or any other device or combination of devices. In certain implementations, the modem 110 may be a part of, or communicatively coupled to, the gateway 111. The gateway 111 may be, for example, a wireless router, a set-top box, a computer server, or any other computing device or combination.

The gateway 111 may be any computing device for communicating with the modem 110 to allow one or more other devices in the example home 102a to communicate with the local office 103, the one or more external networks 109, or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, or the like), or any other device.

Figure 2:
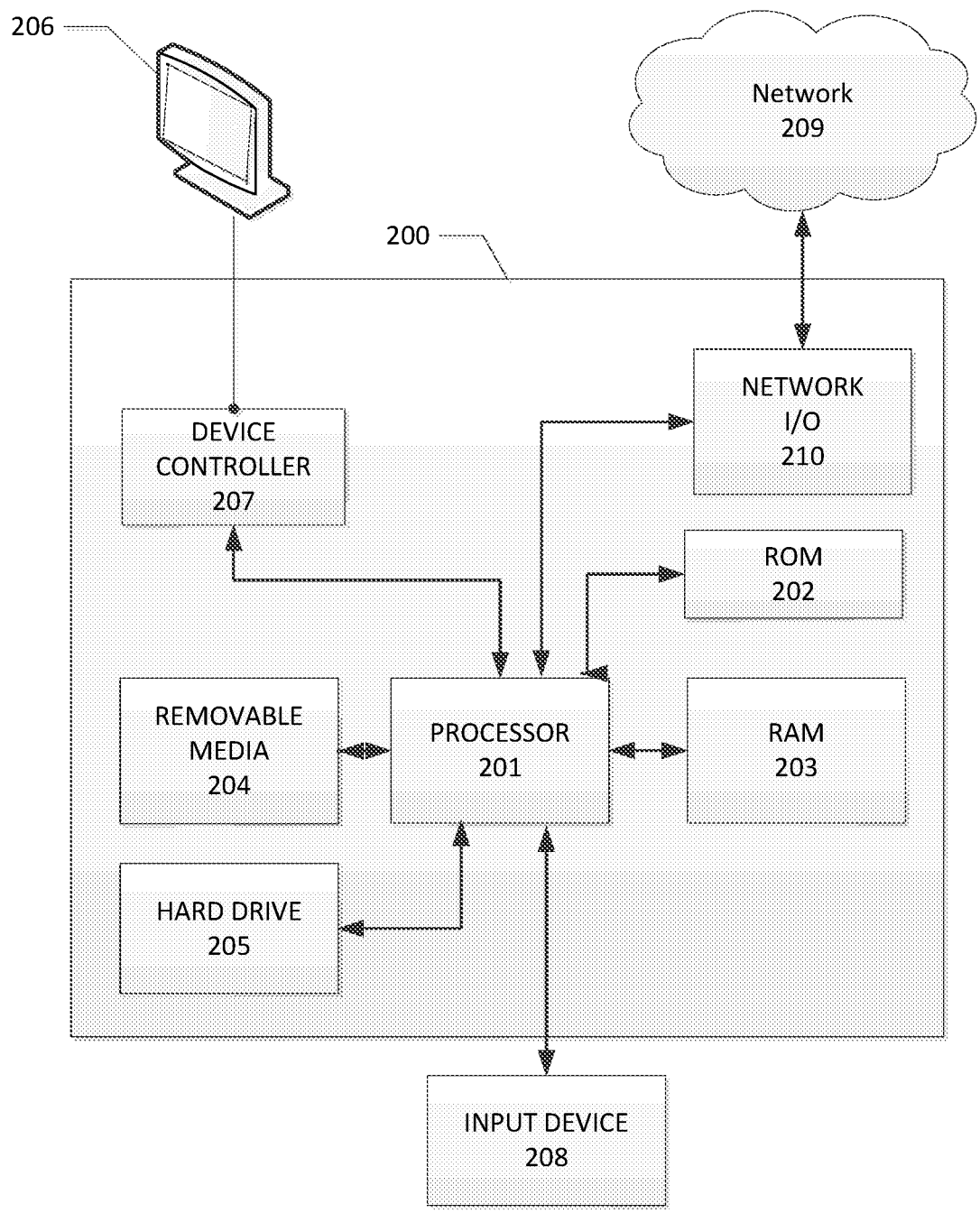
FIG. 2 depicts an illustrative software and hardware device on which various aspects of the disclosure may be implemented.

FIG. 2 illustrates general hardware elements and software elements that can be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, floppy disk, or any other desired electronic storage medium. Instructions may also be stored in a hard drive 205, which may be an internal or external hard drive.

The device 200 may include one or more output devices, such as a display 206 (e.g., an integrated or external display, monitor, or television), and may include a device controller 207, such as a video processor. In some embodiments, the device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. In some embodiments, the network I/O interface 210 may include a cable modem, and the network 209 may include the communication links 101 shown in FIG. 1, the one or more external networks 109, an in-home network, a provider's wireless, coaxial, fiber, or hybrid fiber/coaxial distribution system (e.g., a DOCSIS network), and/or any other desired network.

Figure 3:
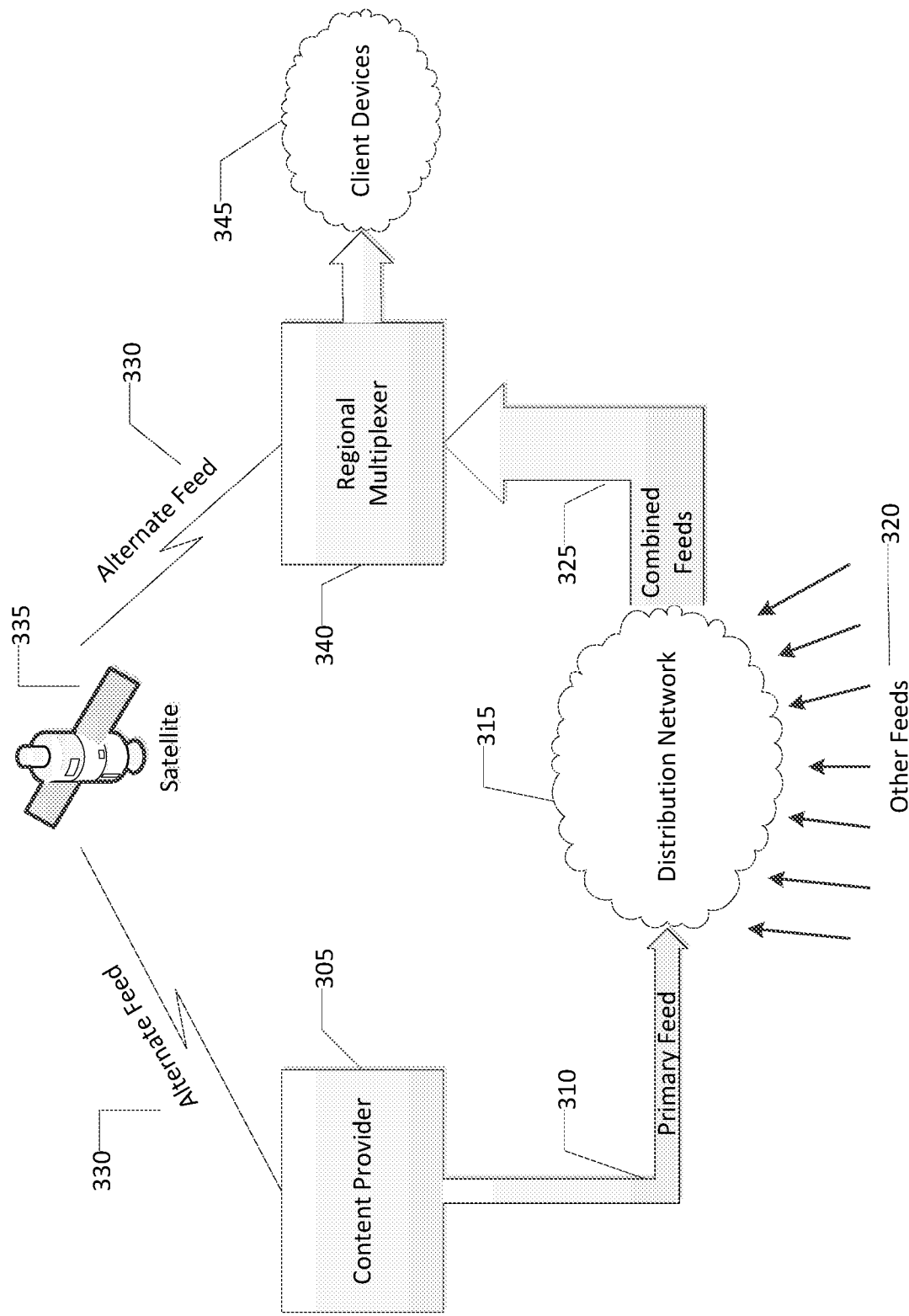
FIG. 3 depicts an illustrative system for delivering alternative content via satellite.

FIG. 3 depicts an illustrative system for delivering alternate content via satellite. A content provider 305 may identify numerous content streams for inclusion in numerous service lineups. The content streams may include content streams to be included nationally in service lineups and/or it may include content streams intended for a particular region or set of regions. In some instances, the content streams intended for the particular region or set of regions may include a primary content stream and one or more alternate content streams that may be better suited for a certain audience, or intended to be outputted due to a regional blackout. In some instances, the content streams may be video feeds, which may represent television channels.

A primary feed 310 may be transmitted by the content provider. For example, the content provider may transmit a primary feed including a content stream to be included nationally in service lineups. A distribution network 315 may be used to carry the primary feed 310 and other feeds 320. The distribution network may be fiber optic lines, cable lines, telephone lines, or any other means of content transmission. The other feeds 320 may come from other content providers. For example, content provider 305 may provide one service, while other content providers may provide other services via other feeds 320, which may be carried on separate communication lines. The combined primary feed 310 and other feeds 320 may be transmitted over the distribution network 315 as combined feeds 325 to a regional multiplexer 340.

The content provider 305 may wish to supply an alternate feed 330 to the regional multiplexer 340, for use in certain markets. For example, a sports network may carry a first football game to be seen by all of its viewers outside of Texas, while its Texas viewers are shown a different game that is of local interest to Texans. In some embodiments, the content provider 305 may transmit the alternate feed to a satellite 335. The satellite 335 may then transmit the alternate feed 330 to the regional multiplexer 340, and the regional multiplexer is responsible for making sure that the correct video feed is placed in the downstream channel/service lineup provided to its customers.

The regional multiplexer 340 may then take the combined feeds 325 and the alternate feed 330 and compose a regional service lineup. The regional multiplexer may replace the primary feed 310 and introduce the alternate feed 330. The regional multiplexer may have to re-encode the resultant feed prior to transmission. For example, primary feed 310 might be a variable bitrate feed that is time multiplexed with other feeds into a single QAM channel. The feeds may then be re-multiplexed into a new feed and transmitted to client devices 345, which may be consumer devices, such as set top box 113.

Figure 4:
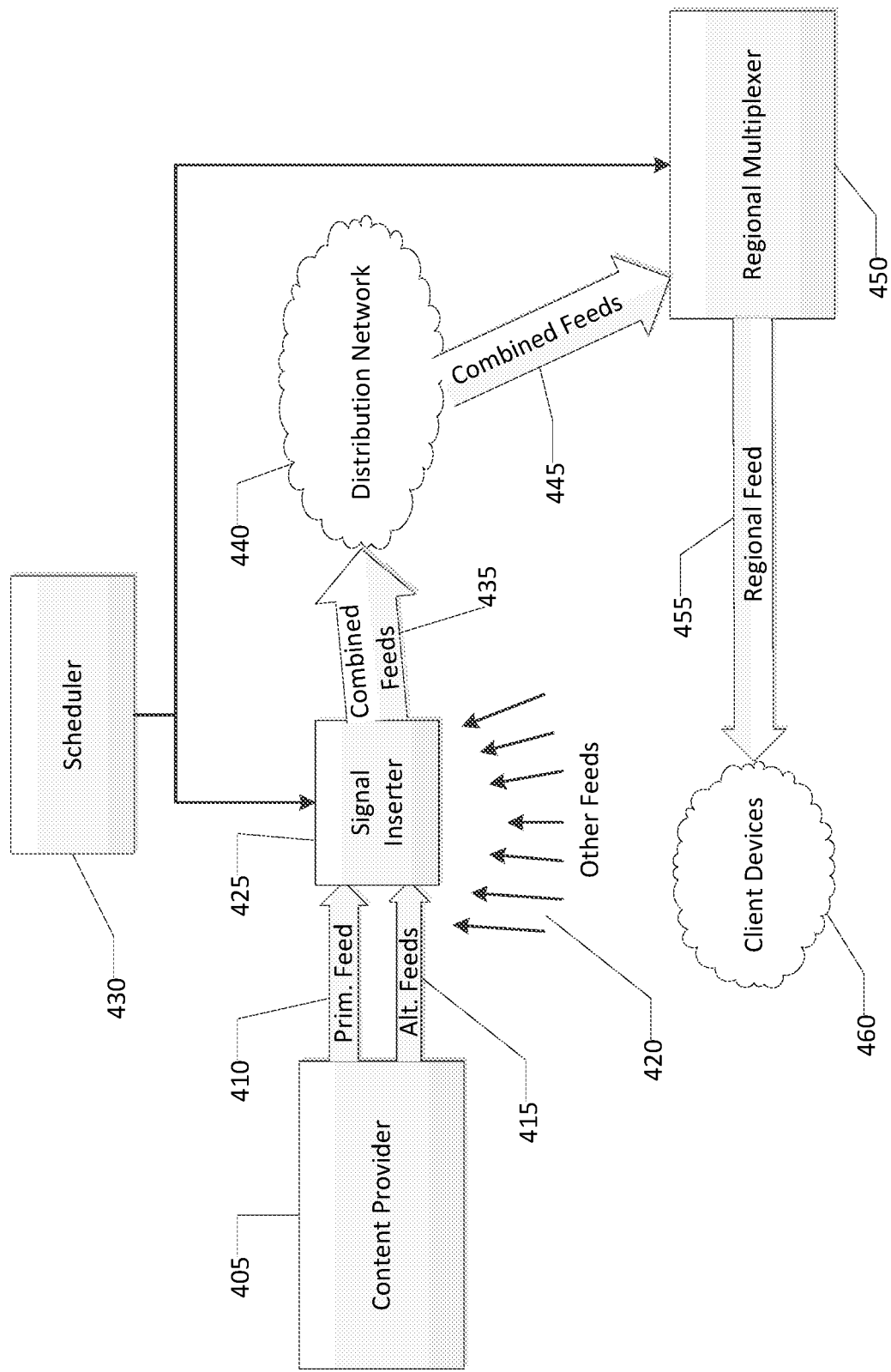
FIG. 4 depicts an illustrative system for delivering alternative content via backbone network.

FIG. 4 depicts an illustrative system for delivering alternative content via a backbone network. Rather than supplying the alternative content via a satellite link while the primary content is sent via the distribution network 315, some or all of the alternative content may be sent along with the primary content down a provider's backbone network, which may comprise, for example, fiber-optic, coaxial and other data transmission networks. A content provider 405 may identify numerous content streams for inclusion in numerous service lineups. The content provider may be any source of content supplied to a distributor. For example, a content provider could be a major sports broadcaster who regularly supplies sports content to service providers, and the service providers may be distributors.

Content streams may be formatted a variety of ways. In some instances, the streams may be formatted to carry television broadcasts. In some instances, the content streams may be formatted as Internet Protocol feeds. For example, a Moving Picture Experts Group (MPEG) protocol may be used to deliver the content streams over an Internet Protocol connection. In some instances, content streams may be Multi-Program Transport Streams (MPTS) and/or Single Program Transport Streams (SPTS).

In some instances, the content provider 405 may supply multiple versions of a feed. A content provider may supply a primary feed 410, and alternate feeds 415. The alternate feeds 415 may be intended to replace the primary feed in certain markets. For example, the primary feed may be a regular national broadcast of a news program. The alternate feed may be a celebration special for a target audience, such as a gubernatorial inauguration for a small state, that replaces the news broadcast for that small state. In another example, one sports contest may usually be broadcast nationally as primary feed 410, while a number of regional games may be supplied as alternate feeds 415 as replacements for primary feed 410 in certain regional markets.

In some embodiments, the primary feed 410 and alternate feeds 415 may be combined with other feeds 420 at a signal inserter 425 to form combined feeds 435 that are ultimately supplied to the various regional multiplexers. In some instances, the signal inserter may take multiple content streams and multiplex them for transmission through a distribution network 440 to the multiplexers. The distribution network 440 may be made up of a fiber optic line, a coaxial cable, a wireless transmission, satellite communication, external networks 109, a combination of these, or virtually any other means of communication. The signal inserter may be responding to instructions and/or a schedule from a scheduler 430. Instructions may instruct the signal inserter as to which feeds to include in the combined feeds 435, and the time(s) at which the insertion should occur. As an example, a major sports broadcasting network may supply one national sports telecast as the primary feed 410 and six regional sports telecasts as the alternate feeds 415 to the signal inserter 425. A number of other channels, such as home improvement or news channels, might be supplied as the other feeds 420 to the signal inserter 425. A scheduler 430 might instruct the signal inserter 425 to include the national sports telecast, five of the six regional sports telecasts, and the other feeds as the combined feeds 435. In some instances, the scheduler may send an Event Signaling and Messaging (ESAM) instruction to the signal inserter which instructs the signal inserter to insert particular feeds for transmission to the distribution network 440. In some instances, there may be multiple signal inserters, such that the signal inserters continually add aggregate feeds into the combined feeds at different points in the distribution network 440 before creating a final set of combined feeds 445.

The scheduler 430 may send instructions to the signal inserter 425. For example, the scheduler 430 may send an ESAM instruction instructing the signal inserter 425 that certain streams should be used for certain regions. The scheduler 430 may be aware of the devices in the network. For example, the scheduler 430 may be aware of the content provider(s), the signal inserter(s), the distribution network (s), the regional multiplexer(s), the regional device(s), and/or the regional zone(s) to be serviced. Based on this information, the scheduler 430 may determine which regional feeds are intended for given streams. The scheduler 430 may then generate an instruction for the signal inserter 425, such as in an ESAM message, instructing the signal inserter which feeds should be assigned to which regions.

The signal inserter 425 may then insert one or more SCTE 35 protocol messages into one or more content streams based on the instruction for use by a regional multiplexer 450 to select among content streams for inclusion in an outputted regional feed 455 to a client device 460. The signal inserter may insert the in-stream instructions based on instructions received from the scheduler. For example, based on the region assignments for a stream given in an ESAM message, the signal inserter 425 may consult a lookup table. A lookup table may specify a region code for a region. The signal inserter may then generate a command that includes the region code and indicates a stream to switch to (e.g., the alternative stream that is to replace the current stream carrying the command) as specified by the ESAM message. The signal inserter may then insert the SCTE 35 protocol command into the content stream. Further discussion of SCTE 35 protocol commands may be found in FIGS. 6-8. This may have the advantage of allowing the downstream multiplexer 450 to choose content streams automatically based on the in-stream messages, rather than needing manual intervention.

The Combined feeds 445 may then be sent through a distribution network 440 to a regional multiplexer 450. The distribution network 440 may be a backbone network capable of handling a large number of streams. For example, the distribution network 440 may be a fiber optic network with over 1 Gbps in bandwidth. This may have the advantage of allowing all the content streams to be sent over the same network. This may eliminate alternative delivery means for alternate feeds 415, such as the method of transmission via satellite described in FIG. 3.

The combined feeds 445 may be received by a regional multiplexer 450. The multiplexer may include a device 200. In some instances, the multiplexer may include specialized multiplexing hardware. For example, the multiplexer may include an application-specific integrated circuit (ASIC) or as a field-programmable gate array (FPGA). The specialized hardware may not be able to function as a general purpose computing device, and may only respond to very specific instructions such as those described herein. The implementation may allow the multiplexer to do real-time or near real-time multiplexing of input streams into multiple pumping processes. The pumping process may be processes executed by the regional multiplexer 450, and each pump process may be responsible for outputting one of the services or channels in the multiplexer's service lineup (e.g., one pumping process may be responsible for supplying the video stream that is to go on slot #2 of the multiplexer's service lineup, and may be responsible for receiving and processing the appropriate input feed for that output slot). Multiplexing may involve a number of techniques, such as statistical multiplexing, time division multiplexing, frequency division multiplexing, code division multiple access multiplexing, some combination of these, or any other form of multiplexing suitable for content stream transmission. In some instances, the multiplexing may conform to QAM standards.

The scheduler 430 may send instructions to a regional multiplexer 450. For instance, the scheduler 430 may send an ESAM message that configures the regional multiplexer 450. For example, the ESAM message may assign a region code to the regional multiplexer 450. Also, the ESAM message may identify default streams for inclusion in a regional feed 455. For example, an ESAM message from the scheduler 430 may specify a service lineup for the regional feed 455. The ESAM message may also specify a primary stream for each slot in the service lineup. The multiplexer may then use the primary stream as the default stream for the method described in FIG. 9.

Based on the configuration received from the scheduler 430 and/or the in-stream instructions inserted by the signal inserter 425, the regional multiplexer 450 may perform a method for multiplexing, such as the method described in FIG. 9, to generate a regional feed 455.

The resulting regional feed 455 may then be transmitted to the client devices 460. For example, a regional multiplexer in Alexandria, Virginia may multiplex in an appropriate regional sports telecast with the other feeds into a regional feed, and transmit it to a set top box in Alexandria. In some instances, the regional feed may be transmitted over the communication link 101 to devices in the home 102a.

Figure 5:
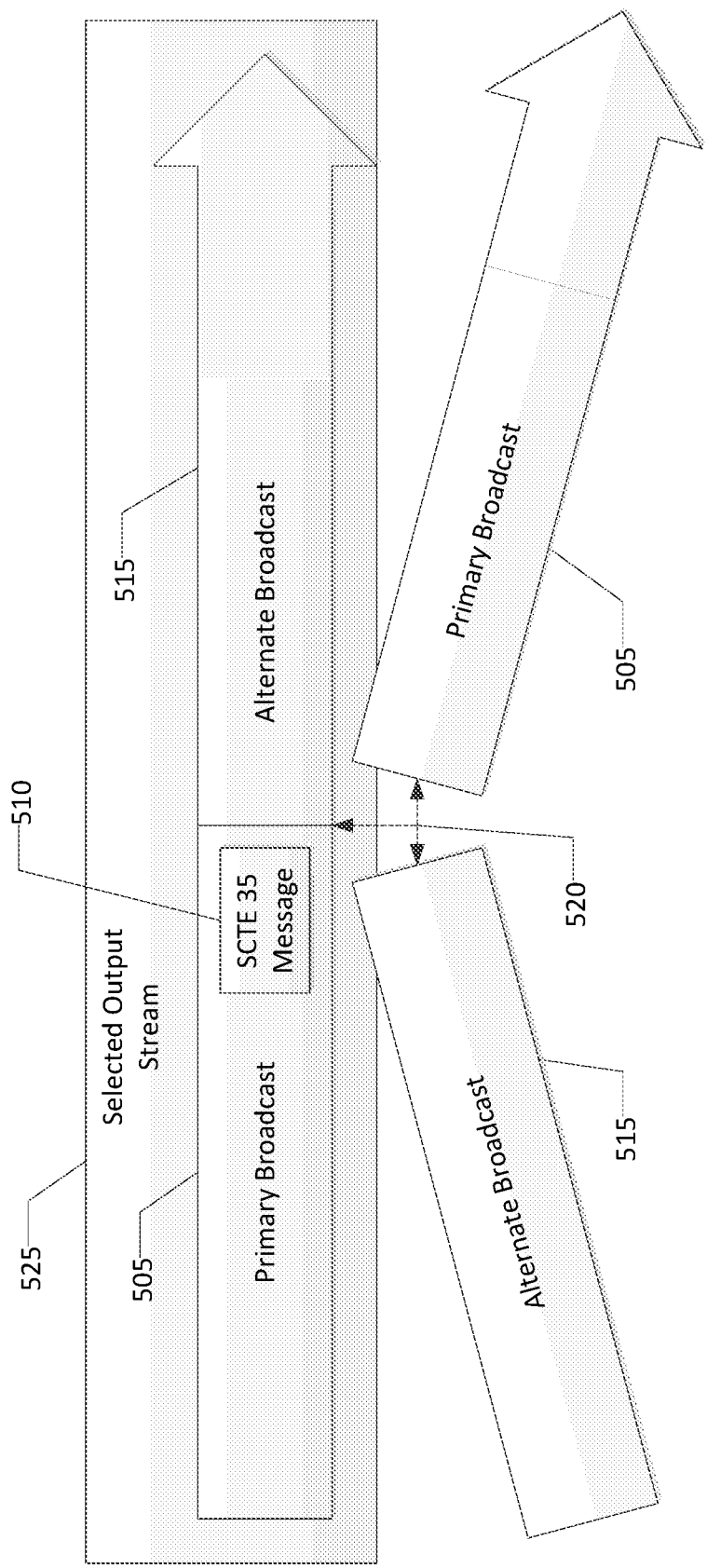
FIG. 5 depicts an illustrative example of switching streams based on an SCTE 35 message.

FIG. 5 depicts an example of switching streams based on an SCTE 35 message. A selected output stream 525 of a regional service lineup may begin with a primary broadcast 505. In some instances, the primary broadcast 505 may be the primary feed 410. For example, a sports channel may run a pre-game show showcasing a day's football games, which is immediately followed by the national game of the week. An alternate broadcast 515 may be available to the regional multiplexer, but may be currently being discarded by the multiplexer and not include in the service lineup that the multiplexer supplies to its users and devices. For example, the alternate broadcast 515 may be a live feed for a regional sporting event, which may be left out of a downstream content stream in favor of the primary broadcast 505. In some instances, the alternate broadcast 515 may be one of the alternate feeds 415.

An SCTE 35 message 510 may be embedded in the primary broadcast 505. The message 510 may instruct a multiplexer to switch between the primary broadcast and the alternate broadcast according to the method described in FIG. 9. This method may include a multiplexing operation 520. The multiplexing operation 520 may switch the alternate broadcast 515 into the selected output stream 525 and begin to discard the primary broadcast 505. For example, when the pre-game show ends, the SCTE 35 message may instruct the multiplexer to broadcast the regional sporting event rather than the national game of the week. The transition may be seamless. For example, a consumer may see the pre-game show transition directly into the regional sporting event view the content stream on a set top box 113.

In some instances, the alternate broadcast 515 may be a lack of content. For example, the primary broadcast 505 may be a pre-game show, and the alternate broadcast 515 may not have any content until a regional sporting event begins at the point where the multiplexing operation 520 occurs—viewers who are blacked out might simply see a message indicating that the game has been blacked out. In another example, there may be a blackout of a football game included in the primary broadcast 505 for the region serviced by the multiplexer, and the alternate broadcast 515 may be a blank screen or message indicating that the football game has been blacked out.

FIG. 6 depicts an example of a section command that might be used as an SCTE 35 protocol instruction for a multiplexer. For example, a section command may be a splice_info_section( ) command (section commands will be referenced as splice_info_section( ) commands throughout for simplicity). In some embodiments, a splice_info_section( ) command 600 may be inserted into a data stream to indicate that the multiplexer should expect a switching command to follow. The splice_info_section( ) command 600 may be placed at the beginning of a transport packet so that the multiplexer can properly interpret the data as an instruction. A signal inserter 425 may insert the splice_info_section( ) into the content stream in response to an instruction from a scheduler 430. For example, the scheduler 430 may send an ESAM message to the signal inserter 425 that prompts the signal inserter to create corresponding SCTE 35 protocol instructions for a downstream multiplexer. The splice_info_section( ) command may indicate to a multiplexer that an SCTE 35 instruction is incoming. An included field splice_command_type( ) field 605 may indicate the type of command to follow. For example, "0000 0100" may indicate a splice_schedule( ) command, or "0000 0101" may indicate a splice_insert( ) command.

FIG. 7 depicts an example of a schedule command that may be used as an SCTE 35 protocol "time trigger" instruction for a multiplexer. For example, a schedule command may be a splice_schedule( ) command (schedule commands will be referenced as splice_schedule( ) commands throughout for simplicity). In some embodiments, a splice_schedule( ) command 700 may instruct a multiplexer to switch to a specified content stream at a specified future time. The command may include multiple fields. The splice_event_id field 705 may indicate particular regions or intended multiplexers for a content stream. For example, the numerical value "0000 0011 0011 0111 0101 0111 1111 0001" in the splice_event_id field 705 may correspond to a particular regional multiplexer or group of regional multiplexers, and the multiplexers may only consider commands with that numerical value. The out_of_network_indicator flag 715 may be used to indicate an alternate broadcast. The flag 715 may indicate that the content stream carrying the command is a primary broadcast, or may indicate that it is an alternate broadcast. The utc_splice_time field 720 may instruct the multiplexer on when to switch to a particular content stream. For example, the utc_splice_time field 720 may indicate that the content stream has an alternate broadcast at 6:45 PM. The unique_program_id field 725 may be a content identifier. For example, it may specify stream 47, or locally stored file 5. If the region specified by splice_event_id field 710 corresponds to the multiplexer, the multiplexer may schedule a switching operation for the time specified by the utc_splice_time field 720 to the content indicated by the unique_program_id field 725. For example, finding that the region code matches the region of the multiplexer, the multiplexer may schedule to switch at 6:45 PM from the current stream to stream 47. Further description of a method of multiplexing based on commands may be found in FIG. 9.

FIG. 8 depicts an example of an insert command that may be used as an SCTE 35 protocol instruction for a multiplexer. For example, an insert command may be a splice_insert( ) command (insert commands will be referenced as splice_insert( ) commands throughout for simplicity). In some embodiments, a splice_insert( ) command 800 may instruct a multiplexer to switch to a particular content stream. The command may include multiple fields. The splice_event_id field 805 may indicate particular regions or intended multiplexers for a content stream. For example, the numerical value "0001 1111 1101 0101 0101 1100 0101 0101" in the splice_event_id field 805 may correspond to a particular regional multiplexer or group of regional multiplexers, and the multiplexers may only consider commands with that numerical value. The out_of_network_indicator flag 810 may be used to indicate an alternate broadcast. For example, the flag 810 may indicate that the content stream is a primary broadcast, or may indicate that it is an alternate broadcast. The unique_program_id field 815 may be a content identifier. For example, it may specify stream 47, or locally stored file 5. If the region specified by splice_event_id field 805 corresponds to the multiplexer, the multiplexer may immediately switch to the content indicated by the unique_program_id field 815. For example, finding that the region code matches the region of the multiplexer, the multiplexer may switch from the current stream to stream 47. Further description of a method of multiplexing based on commands may be found in FIG. 9.

FIG. 9 depicts an illustrative method for multiplexing based on in-stream signaling. The method may be performed by a multiplexer, such as a regional multiplexer 450. In some embodiments, an instance of the method may operate on a stream for each output of the multiplexer corresponding to a slot in a regional service lineup. This may be done concurrently for each stream. The multiplexer may initially perform the method on a default stream assigned for the slot by the scheduler 430. Once a stream has been switched, the method may continue operating on the new stream multiplexed for the slot.

At step 905, the multiplexer may be configured. The configuration may include a mapping, which may configure the multiplexer to assign given services to given slots. This mapping may be configured by an ESAM message from a scheduler 430, such as described in FIG. 4. For example, a channel on cars may be assigned to a third slot in a fourth QAM channel, which may correspond to a service on a region's service lineup. In some instances, a plurality of alternative content streams may be assigned to a given slot in the service lineup. For example, a sports channel may have seven different assigned streams. In this example, there may be national game of the week and six different games to be shown in different regions, though all may be assigned to the same slot in the service lineup. Since many or all content streams may be transmitted over the distribution network 440, some content streams may not be used at all for a given region. For example, a regional service lineup in Oregon may not include any slots for a content stream of an Alabama regional sports channel for any tier of service, perhaps due to bandwidth constraints downstream from the multiplexer, so the channel may be discarded. In some instances, a default stream for each slot in a service lineup may be configured in case of an error and/or a lack of instruction.

The multiplexer may also be configured with an assigned region. For example, a scheduler 430 may provide a region identifier of "0000 0011 0011 0111 0101 0111 1111 0001" to a multiplexer servicing Alexandria, Virginia. This will allow the multiplexer to consider only commands that pertain to its particular region as described further below.

At step 910, the multiplexer may check for a command. The multiplexer will inspect the stream currently multiplexed by a pump to a slot in a regional service lineup for an in-stream command. For instance, the multiplexer may check for an SCTE 35 protocol message command present in the content stream. In some instances, the command may comprise a splice_info_section( ) message followed by either a splice_schedule( ) message or a splice_insert( ) message. In some instances, the multiplexer may simply identify a splice_info_section( ) message to determine that there is an SCTE 35 protocol message command. If there is no command, the multiplexer may check for a time trigger 935. Otherwise, the multiplexer may proceed to further parse the command at step 915.

At step 915, the multiplexer may check if the region code of the command matches an assigned region identifier for the multiplexer. For example, the multiplexer may have an assigned region identifier of "0000 0011 0011 0111 0101 0111 1111 0001." The multiplexer may check its assigned region identifier versus a code in the command. For example, a splice_event_id field 705 or splice_event_id field 805 might include the code "0000 0011 0011 0111 0101 0111 1111 0001." If the region code is a match, the multiplexer may proceed to step 920. Else, the multiplexer may return to checking for a command at step 910.

At step 920, the multiplexer may check to see if the command instructs the multiplexer to switch now. For instance, the multiplexer may check to see if the command is a splice_insert( ) command as described in FIG. 8. If the command does instruct the multiplexer to switch now, the multiplexer may proceed to parse the command for switching instructions by checking a content ID at step 940. If the command does not instruct the multiplexer to switch now, the multiplexer may proceed to check if the command instructs the multiplexer to switch at a later time at step 925.

At step 925, the multiplexer may check to see if the command instructs the multiplexer to set a time trigger for switching at a later time. For instance, the multiplexer may check to see if the command is a splice_schedule( ) command as described in FIG. 7. If the command does instruct the multiplexer to set a time trigger for switching at a later time, the multiplexer may proceed to step 930. Else, the multiplexer may return to check for a command at step 910.

At step 930, the multiplexer may schedule a time trigger for switching at a later time. For instance, a splice_schedule( ) command may include instructions to splice to content indicated by a unique_program_id field 725 at a time specified by a utc_splice_time 720 field as described in FIG. 7. For example, a splice_schedule( ) command may instruct the multiplexer to switch to stream 168 at 6:00 PM. The multiplexer may store that information into a scheduling table as a time trigger for use at step 935. Afterwards, the multiplexer may return to check for a command at step 910.

At step 935, the multiplexer may check to see if a time trigger has been reached. The multiplexer may consult a scheduling table to determine if the current time approximately matches the time set as a time trigger. If the current time matches the time set as a time trigger, the multiplexer may proceed to parse the command for switching instructions by checking a content ID at step 940. Else, the multiplexer may return to check for a command at step 910.

At step 940, the multiplexer may check a content ID to determine if the ID corresponds to a content stream or local storage. For example, a unique_program_id field 725 or unique_program_id field 815 may specify a content ID. In the case of a time trigger, the content ID store in step 930 may retrieved from a scheduling table. The multiplexer may check the content ID to determine if it corresponds to an input content stream. For example, the multiplexer may consult a mapping to determine if the content ID matches an input content stream. If the content ID matches a content stream, the multiplexer may proceed to changing the pump at step 945. If the content ID matches an ID for some locally stored content, the multiplexer may proceed to retrieve the content from local storage at step 950.

At step 945, the multiplexer may change the output feed provided by one of the pumping processes to supply the feed identified by the content ID. The multiplexer may switch the pumping process to output the content stream corresponding to the content ID. The method continues to operate on the active content stream, so the method will now process the new outputted stream. In some instances, switching streams may be recorded in a log. This log may be compiled in real time. In some instances, in the event of some kind of error, the multiplexer may switch to a default stream. Once the pump has been switched, the multiplexer may return to checking for a command at step 910.

In some embodiments, the multiplexer may perform the multiplexing operation without re-encoding the input signals. Re-encoding is sometimes performed to manage the bitrate and bandwidth used (e.g., a video feed may be re-encoded to a more lossy form of encoding, reducing the data size). In some instances, a content provider, such as content provider 405, may provide alternate streams that do not exceed the bitrate of a primary stream. These streams may be the same bitrate, or be a bitrate that does not exceed the minimum bitrate of the input streams. For example, a default stream may be a variable bitrate stream, and an alternate stream may be a constant bitrate stream that may be equal to or less than the bitrate of the default stream. In other instances, the streams may be encoded in varying ways, and the multiplexer may be responsible for multiplexing the streams within bandwidth requirements. The multiplexer may perform the multiplexing operation on the original data streams as produced by the content provider 405 so that the streams are multiplexed less often with less re-encoding. By reducing the amount of multiplexing and re-encoding of underlying content streams, less compression may be used. This may have the advantage of maximizing the amount of content that can be broadcasted and/or maximizing the quality and/or resolution of the content.

At step 950, the multiplexer may select content from local storage. The multiplexer may select locally stored content matching the content ID. The locally stored content may be stored in some form of memory, such as a tape or hard drive attached to the multiplexer. The multiplexer may then insert content from local storage into the stream being multiplexed. After inserting the content, the multiplexer may return to checking for a command at step 910.

In some embodiments, one or more steps of FIG. 9 may be implemented by retrieving information from the scheduler. In some instances, upon receiving an SCTE 35 protocol message on a channel indicating a blackout event, the multiplexer may obtain additional information from the scheduler. For example, a multiplexer may check for an SCTE 35 protocol message as in step 910. Upon detecting the SCTE 35 protocol message, the multiplexer may request commands or information from the scheduler. In some embodiments, a scheduler may supply a region code, a switch now instruction, a time trigger instruction, an ID for streaming or content storage, and/or any other command or piece of information which may be supplied in an SCTE 35 protocol command as described above. For example, at step 915, a region code may be obtained from the scheduler.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

What is claimed is:

1. A method comprising:
   receiving a plurality of video feeds;
   receiving regional assignment information, wherein a piece of regional assignment information associates a first video feed of the plurality of video feeds with a region;
   inserting a command into a second video feed of the plurality of video feeds, wherein:
   the command identifies the first video feed to replace the second video feed for the region; and
   the command comprises a region code corresponding to the region; and
   transmitting the first video feed and the second video feed, wherein the second video feed comprises the command.

2. The method of claim 1, wherein the regional assignment information is received via an event signaling and messaging instruction.

3. The method of claim 1, wherein inserting the command into the second video comprises inserting a society of cable telecommunications engineers (SCTE) 35 protocol command.

4. The method of claim 1, further comprising generating the region code for the region using a lookup table and the received regional assignment information.

5. The method of claim 1, wherein the first video feed and the second video feed are transmitted to a multiplexer associated with the region.

6. The method of claim 1, wherein the received plurality of video feeds comprise at least one primary feed and at least one alternate feed.

7. The method of claim 6, further comprising, combining a primary feed with an alternate feed.

8. The method of claim 1, further comprising:
receiving the first video feed and the second video feed at a multiplexer in the region; and
automatically displaying the first video feed in response to the command.

9. An apparatus comprising:
one or more processors; and
memory storing computer-readable instructions, that when executed by the one or more processors, cause the apparatus to:
receive a plurality of video feeds;
receive regional assignment information, wherein a piece of regional assignment information associates a first video feed of the plurality of video feeds with a region;
insert a command into a second video feed of the plurality of video feeds, wherein the command identifies the first video feed to replace the second video feed for the region; and
transmit the first video feed and the second video feed to a multiplexer associated with the region, wherein the second video feed comprises the command.

10. The apparatus of claim 9, wherein the apparatus receives the regional assignment information via an event signaling and messaging instruction.

11. The apparatus of claim 9, wherein the apparatus if further caused, when inserting the command into the second video, to insert a society of cable telecommunications engineers (SCTE) 35 protocol command.

12. The apparatus of claim 9, wherein the command comprises a region code corresponding to the region.

13. The apparatus of claim 12, wherein the apparatus is further caused to generate the region code for the region using a lookup table and the received regional assignment information.

14. The apparatus of claim 9, wherein the plurality of video feeds comprise at least one primary feed and at least one alternate feed.

15. The apparatus of claim 9, wherein the apparatus is further caused to combine a primary feed with an alternate feed.

16. A method comprising:
receiving a plurality of video feeds;
receiving regional assignment information, wherein:
a piece of regional assignment information associates a first video feed of the plurality of video feeds with a region; and
the regional assignment information is received via an event signaling and messaging instruction;
inserting a command into a second video feed of the plurality of video feeds, wherein the command identifies the first video feed to replace the second video feed for the region; and
transmitting the first video feed and the second video feed, wherein the second video feed comprises the command.

* * * * *